June 14, 1949.  E. MESCHTER  2,473,382
APPARATUS FOR TREATING MOTION-PICTURE FILM
Filed Dec. 24, 1947  4 Sheets-Sheet 1

INVENTOR.
EMERY MESCHTER
BY
Lynn Barratt Morris

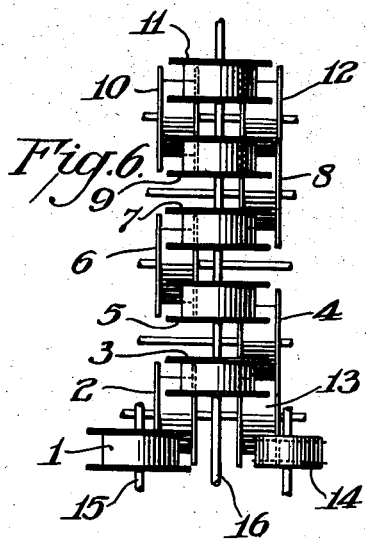
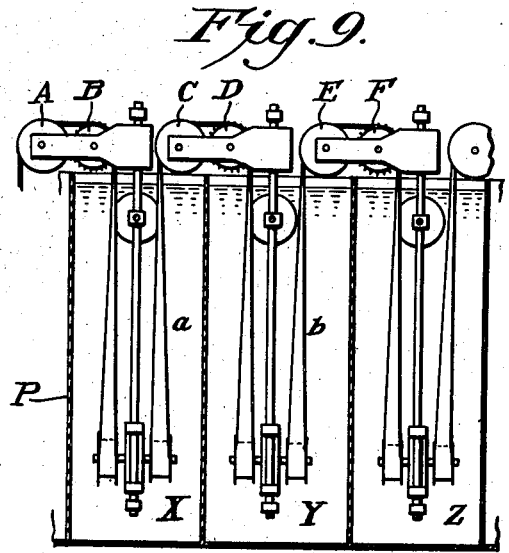
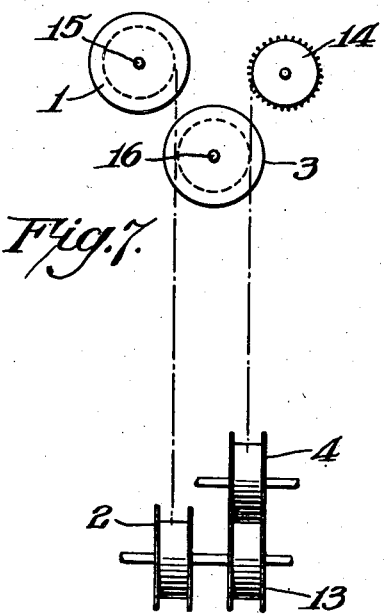
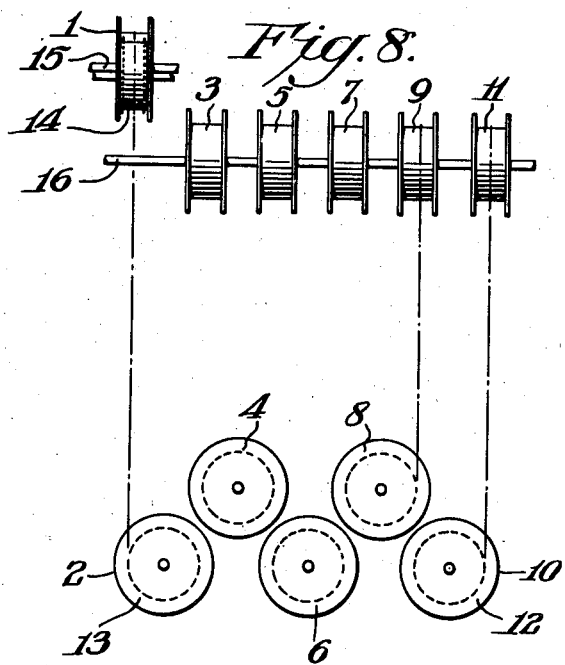

June 14, 1949.  E. MESCHTER  2,473,382
APPARATUS FOR TREATING MOTION-PICTURE FILM
Filed Dec. 24, 1947  4 Sheets-Sheet 3
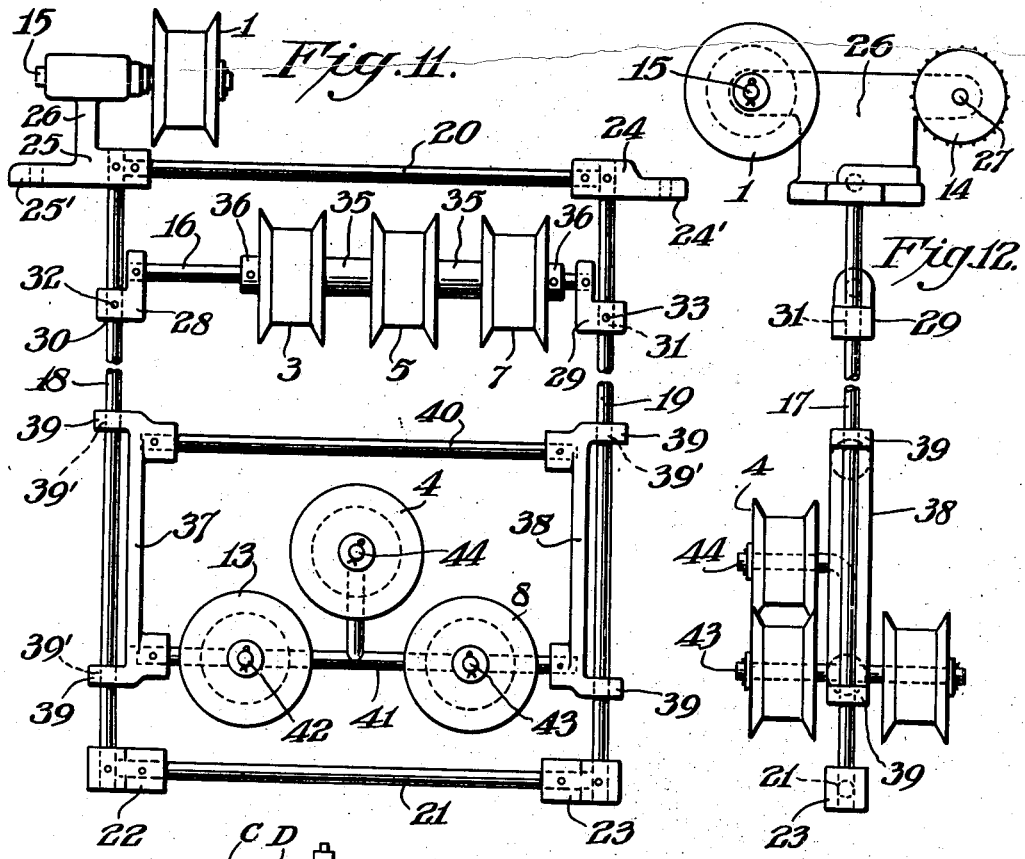
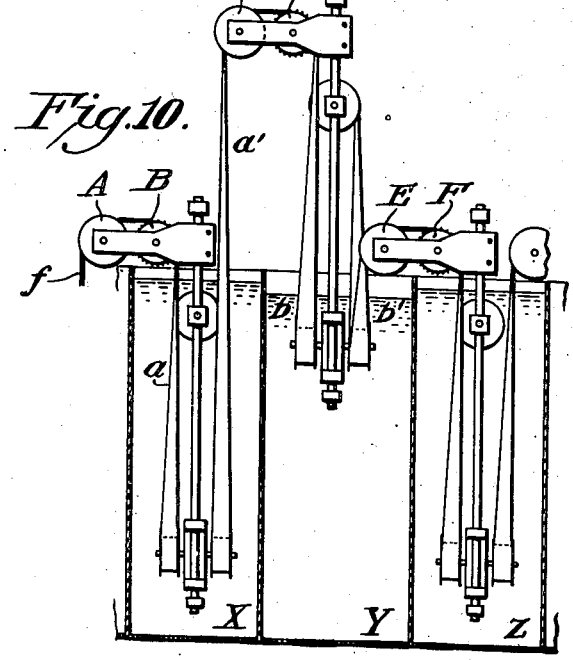
INVENTOR.
EMERY MESCHTER
BY
Lynn Barrett Morris
ATTORNEY June 14, 1949.   E. MESCHTER   2,473,382
APPARATUS FOR TREATING MOTION-PICTURE FILM
Filed Dec. 24, 1947   4 Sheets-Sheet 4
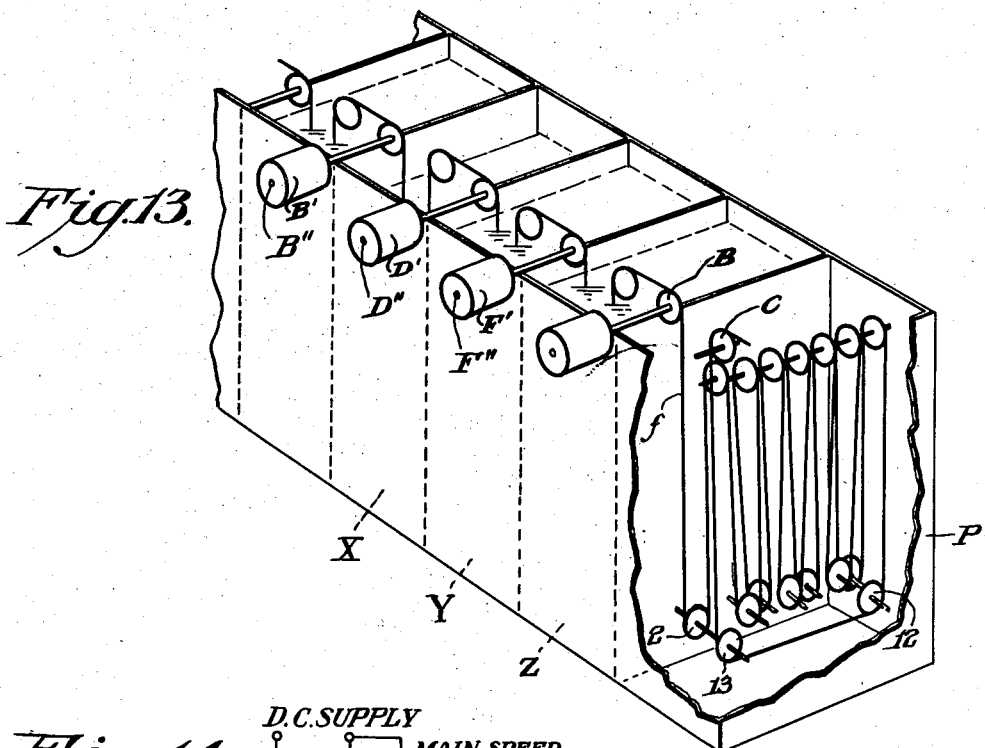
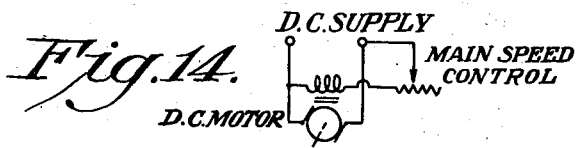
INVENTOR.
EMERY MESCHTER
BY
Lynn Barratt Morris
ATTORNEY Patented June 14, 1949

2,473,382

UNITED STATES PATENT OFFICE 2,473,382

APPARATUS FOR TREATING MOTION-PICTURE FILM

Emery Meschter, Towanda, Pa., assignor to E. I. du Pont de Nemours & Company, Wilmington, Del., a corporation of Delaware Application December 24, 1947, Serial No. 793,615

2 Claims. (Cl. 271—2.3)

This invention relates to apparatus for treating motion picture film. More particularly, it relates to an apparatus for treating continuous lengths of motion picture film. It also relates to a film guiding mechanism for treatment of film in processing tanks.

An object of this invention is to provide improved apparatus for treating continuous lengths of motion picture film. Another object is to provide such an apparatus wherein the film element moves over a plurality of spaced guiding rollers without damage to its edges. Another object is to provide such apparatus which is useful for both negative and positive film and for developing, fixing, and other aqueous processing of continuous lengths of photographic film. A further object is to provide such an apparatus wherein the length of treatment of the film in various baths can readily be adjusted. Another object is to provide a simple and economical motion picture film treating apparatus which requires a minimum amount of space.

Another object of the invention is to provide a film guiding mechanism which will permit a film processing machine of great flexibility in which the length of film immersed in any one processing bath may be varied over wide limits independently of the length immersed in other baths.

Another object of the invention is to provide a film guiding mechanism which will permit a film processing machine of great flexibility in which the film enters and leaves each processing step along the same straight line, thereby allowing any one or more processing tanks to be by-passed without disturbing the film threading in any other tank.

Another object of the invention is to provide a film guiding mechanism which will at all times provide "true tracking" of the film over the spools, thereby preventing damage to the film.

Another object of the invention is to provide a film guiding mechanism which will, in combination with the other advantages, permit the use of processing tanks or drying units which are short (along the length of the processing machine) but wide, thereby providing a large number of processing steps in a machine of minimum length.

Another object of the invention is to provide a film guiding mechanism which will permit the spool assembly of any one processing tank to be raised for inspection or adjustment independently of all other assemblies without cutting or splicing the film threaded in the processing machine.

Another object of the invention is to provide a film guiding mechanism which will permit convenient threading of the film in a manner such that the emulsion side never comes into contact with a spool surface, but causes the film to run always on the base side.

Another object of the invention is to provide a film guiding mechanism which, in combination with the preferred arrangement of driving motors, will permit the film threading path on any one spool assembly unit to be lengthened or shortened without cutting or splicing the film threaded in the processing machine.

Another object of the invention is to provide a film guiding mechanism which will permit the film to remain below the surface of the processing solutions except when passing from one unit to another, thereby reducing effects of aerial oxidation to an absolute minimum.

Still other objects will be apparent from the following description of the invention.

The motion picture film treating apparatus of this invention consists of a series of film treating tanks, each of which is provided with a unit film guiding mechanism. The units are adapted for simultaneous and synchronous operation but the speed of various groups of units may be caused to depart from synchronism in order to feed more film into or decrease the length of film in any chosen tank. This can be done without interfering with the continuous operation of the entire apparatus.

Fig. 6 is a plan view of the unit of Fig. 1;

Fig. 7 is an end view of the unit of Fig. 1;

Fig. 8 is a side view of the unit of Fig. 1;

Fig. 9 is a side elevation of three modified unit film guiding mechanisms in adjacent tanks;

Fig. 10 is a side elevation of three modified unit film guiding mechanisms in adjacent tanks, one unit being in raised position;

Fig. 11 is a side elevation of a unit film guiding mechanism mounted on a suitable frame;

Fig. 12 is an end elevation of a unit film guiding mechanism mounted on a suitable frame;

Fig. 13 is an isometric view of five tanks with film guiding units in operative association; and Fig. 14 is a view of a system of controlling the apparatus of Fig. 13.

Figure 1:
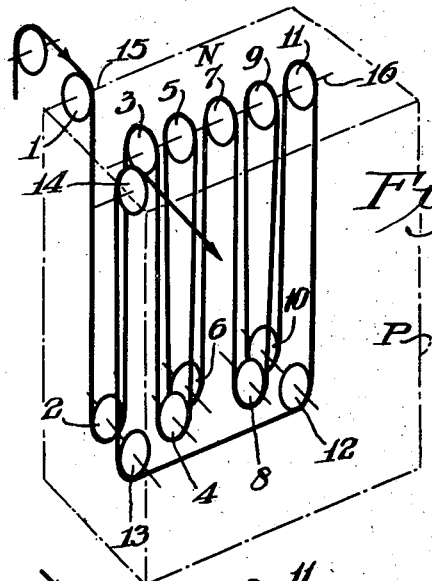
Fig. 1 is a schematic isometric view of one type of unit film guiding mechanism.

The unit film guiding mechanism of Fig. 1 is disposed in processing tank P. It consists of an idler film guiding spool 1 which is mounted on a shaft 15. An odd number N of coaxial spools 3, 5, 7, 9, and 11 are mounted on shaft 16. They are free to turn on shaft 16 independently of each other, since 3, 7, and 11 rotate in a direction opposite to that of 5 and 9. The axes of both shafts 15 and 16 are perpendicular to the direction of film travel through the apparatus. The axis of shaft 16 may be above or below the surface of the liquid in the treating tank. The odd number N may, of course, be varied by adding or subtracting the desired number of idler spools. A second group of idler spools equal in number to $$\frac{(N+1)}{2}$$

e. g., spools 2, 6, and 10, are disposed on stub shafts which are horizontal and parallel to each other and to the direction of film travel through the machine. These idler spools are in the same plane and may be mounted on a movable frame in a manner which is well known in developing machines. A third group of idler spools equal in number to $$\frac{(N+1)}{2}+1$$

is similarly disposed on axes parallel to those of the second group but in a lower plane and are mounted on the same movable frame. These idlers, e. g., 13, 4, 8, and 12, all lie in the same plane. Drive sprocket 14 is mounted on an axis perpendicular to the direction of film travel through the apparatus. The sprocket 14 and idler 1 have medial axes in the same plane.

The group of idler spools 2, 4, 6, 8, 10, 12, and 13 can be made free floating as shown in Fig. 11 or by various equivalent means. By such construction, the total length of film in the processing tank P can be readily varied. The novel relationship of the spools permits much greater variation in the length of film in the processing baths. The various spools are maintained in a "true tracking" relationship. To be more specific, the lines drawn tangential to the surface of the two spools and connecting their transverse centers must be perpendicular to the axes of rotation of the two spools. This relationship is more clearly shown in Figs. 6, 7, and 8 of the drawing. Thus, although there is a 90° twist in the film threaded over two spools, it leaves one spool and approaches the other spool without shear or rubbing. The variation in the length of film in the processing bath referred to above is illustrated in Figs. 2, 3, 4, and 5.

Figure 2:
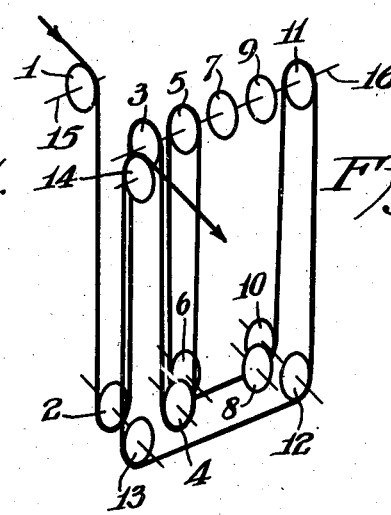
Fig. 2 is a view like Fig. 1 but shows a modified manner of threading the film through the unit.
Figure 3:
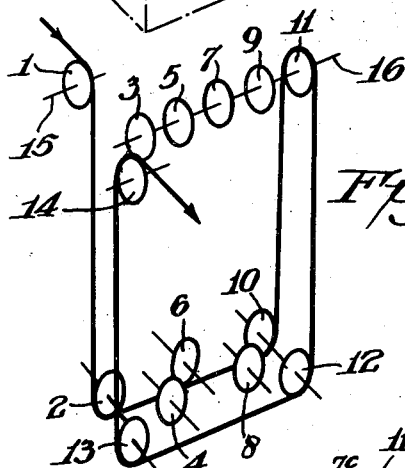
Fig. 3 is a view like Fig. 1 but shows another modified manner of threading the film through the unit.

In Fig. 2 a wide variation is obtained by passing the film directly from idler spools 6 to 10, thus eliminating passage over spools 7, 8, and 9. In Fig. 3 the film is passed directly from spool 2 to spool 6 and spool 10, thus eliminating passage over spools 3, 4, 5, 7, 8, and 9.

Figure 4:
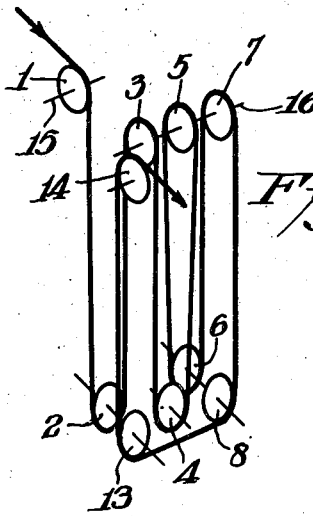
Fig. 4 is a view of a unit like that of Fig. 1 but of reduced film capacity.
Figure 5:
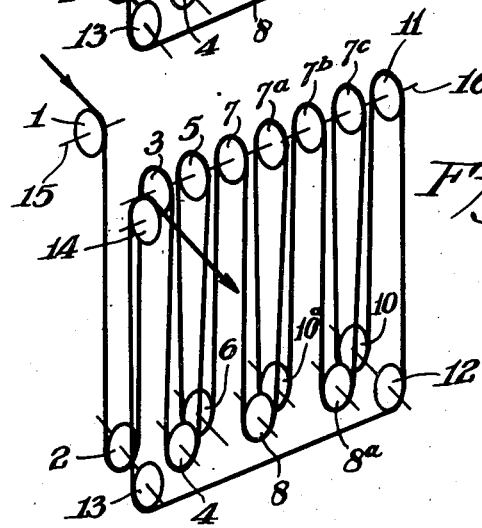
Fig. 5 is a view like the unit of Fig. 1 but of increased film capacity.

Fig. 4 is similar to Fig. 2 but eliminates two spools in the upper part and two in the lower part of the mechanism. Fig. 5 is similar to Fig. 2 but adds two spools to the upper part and two to the lower part.

Referring now to Fig. 11, there is shown a practical manner of attaching the guiding spools to a removable framework. Four spools have been eliminated from the unit shown in Fig. 1 for the sake of clarity. A rectangular frame 17 which consists of side rods 18 and 19 and end rods 20 and 21 which are joined at the corners by welding or by means of joint members 22, 23, 24, and 25 which have holes which are adapted to receive the ends of the rods. The rods may be welded in the holes or held by means of bolts or set screws. Joint members 24 and 25 have extended arm portions 24' and 25' which are adapted to rest on the end walls of the processing tanks. Joint member 25 has an additional extended arm which has a bearing bracket 26 which holds stub shafts 15 and 27 on which are journaled idler spool 1 and sprocket 14. Shaft 16 is fixedly mounted on brackets 28 and 29 which have holes 30 and 31 through which rods 18 and 19 respectively pass. Set screws 32 and 33 enable one to lock shaft 16 and its retaining brackets at any desired point along rods 18 and 19. Three idler spools are revolvably mounted on shaft 16. Five lower spools coact with the three upper spools as will be described below. The upper spools may be spaced by means of intermediate collars 35 and locking collars 36.

A slidable frame carries the five lower spools. It is rectangular in shape and slides up and down rods 18 and 19. It consists of end brackets 37 and 38 which have outwardly extending arms 39 which are provided with holes 39' through which extend the rods. The inner top and bottom corners of the brackets have recessed holes which receive frame members 40 and 41. These members may be welded, bolted, or otherwise affixed to the end brackets. The lower frame member has stub shafts affixed to it. The bottom stub shafts 42 and 43 have spools on each side. Upper stub shaft 44 is angularly disposed and carries a single spool.

The lower frame can, of course, be modified to carry more or less than the five members by adding or eliminating further stub shafts. These stub shafts can be adjustably mounted or removably mounted by means of bolts, set screws, etc., similar to the manner in which shaft 16 is mounted.

It will be noted that idler spool 1 and sprocket 14 are mounted on the removable frame 17 in Figs. 11 and 12. Another and more practical construction is shown in Figs. 9 and 10. In this construction the idler and sprocket which control the entry and exit of the continuous film element f into and from any given processing tank are carried by different units. Observe that idler A and sprocket B are now mounted on the frame of unit X, C and D are mounted on the frame of unit Y, and E and F are mounted on the frame of unit Z, etc. The film path, as more clearly shown in Fig. 13, is unchanged. The units are so supported that they may move vertically independently of one another. Any unit may be raised as shown in Fig. 10 without the necessity of cutting or splicing the film. As unit film guiding mechanism Y rises, strand a of film f must increase in length to that of a' as shown in Fig. 10, while strand b of the film on unit Y decreases in length to that of b' as shown in Fig. 10. The increase required by a is exactly supplied by the decrease in b and no cutting is required. This arrangement permits any unit to be raised independently in any other unit. Thus, when developing, washing, and fixing solutions are maintained in adjacent tanks, the time of treatment can readily be varied.

The preferred system of driving motors to be applied to the film processing machine under consideration is diagramed in Fig. 14 and is to be regarded as applying to Fig. 9 or Fig. 13. Suppose, in Fig. 9, that the film is to move from left to right through steps X, Y, and Z in sequence. The film driving power is derived from follower self-synchronizing motors B', D' and F' which respectively actuate shaft B'', D'' and F''. These self-synchronizing motors are actuated by the system of Fig. 14. Two master self-synchronizing motors MI and M2 are driven mechanically by a variable speed motor to which they are connected by gears or other means in a manner such that M2 rotates faster than MI for a given speed of the main driving motor. The overall speed of the machine is controlled by the speed of this main driving motor. The single phase windings of the master self-synchronizing motors are connected to those of the followers B', D', and F' as shown, through switches T and S mounted conveniently to each processing unit or tank. T is a break-before-make spring switch, shown in its normal position, and S is a simple break switch, also preferably incorporating a spring return to the normally closed position illustrated. Polyphase power is applied to the polyphase winding of all self-synchronizing motors but inasmuch as these connections are identical for all motors and involve no switching, they have been omitted from the diagram to avoid confusion.

The operation of the system is as follows: With all switches in their normal positions as shown, the follower self-synchronizing motors B', D', and F' are all connected to master MI; they will all revolve in exact synchronism with MI and the film is driven through the processing machine at a uniform rate. Suppose now that slack is required in tank for unit X to drop the bottom spool assembly and cause more film to be threaded in such tank. This is accomplished by operating switch $Sx$. Opening $Sx$ breaks the circuit to D', F', and succeeding motors, which all stop immediately. B', however, remains connected to MI and continues to run. Film thus continues to enter the tank for unit X, supplied by B', but none leaves X since D' is at rest. The lower spool assembly of X, therefore, drops as desired. Supplying slack to any other tank is accomplished just as easily; operating $Sy$ stops F' but allows B' and D' to continue to run, thereby supplying slack to Y and operations of $Sz$ supplies slack to Z.

On the other hand, decreasing the amount of film threaded on any unit is accomplished by operating the "T" switches. Throwing $Tx$ to the righthand position leaves B' connected to MI'; B, therefore, continues to revolve at the normal rate. The switch action disconnects D' and F' from MI and connects them to M2; they begin at once to revolve in synchronism with M2, which is faster than MI. Film, therefore, is carried out of tank for unit X by D' faster than it is supplied by B, and there will be a decrease in the length of film threaded in X. Operation of $Ty$ removes film from step Y by leaving B' and D' connected to MI (normal) and connecting F' to M2 (fast). The arrangement of motors and switches applies without change to the case where B' and C' are supported on the frame of unit X, D' and E' on Y, etc., as well as to the exact spool and sprocket disposition shown in Fig. 9.

It will be apparent from the above description that a novel and useful motion picture film treating apparatus has been developed. This apparatus and the unit film guiding mechanisms have utility for various aqueous treatment of continuous lengths of perforated motion picture film. It is especially useful in developing and fixing operations for black and white film but can be used for color development processes, bleaching processes, toning, washing, impregnating, treatment of sound records, etc. The various solutions necessary for these operations are maintained in the various tanks.

As many apparently widely different embodiments of this invention may be made without departing from the spirit and scope thereof, it is to be understood that the invention is not limited to the specific embodiments thereof except as defined in the appended claims.

What is claimed is:

1. A unit film guiding mechanism for conducting continuous lengths of motion picture film through processing solutions comprising an idler film guiding spool and a film drive sprocket disposed on spaced parallel horizontal axes and having the median lines of their peripheral film guiding surfaces in alignment, an odd number N series of freely revolvable film guiding spools, laterally disposed on a common horizontal axis which is parallel to, between and below the axes of said sprocket and idler film guiding spool, a second series of freely revolving film guiding spools $$\frac{(N+1)}{2}$$

in number, on individual axes parallel to each other and perpendicular to and on a level lower than said first N series and disposed with the median lines of their film guiding surfaces in a vertical plane passing between the idler film guiding spool and the nearest peripheral surfaces of the N series of spools, said individual horizontal axes being located in vertical planes passing between the idler film guiding spool and the first of the N spools and between the next even and odd numbered successive N spools respectively, and a third series of film guiding spools $$\frac{(N+1)}{2}+1$$

in number all disposed in a vertical plane passing between the drive sprocket on the nearest peripheral faces of the N spools on the common axis, the first and last of the spools being disposed on horizontal axes which are extensions of those of the first and last of the above mentioned $$\frac{(N+1)}{2}$$

spools and the remainder being disposed on horizontal axes parallel to those of the $$\frac{(N+1)}{2}$$

spools and on a higher level, said axes being located in vertical planes between the odd and even numbered successive N spools respectively, the second and third series of spools being mounted on a vertical movable frame.

2. A unit film guiding mechanism for conducting continuous lengths of motion picture film through processing solutions comprising an idler film guiding spool and a film drive sprocket disposed on spaced parallel horizontal axes and having the median lines of their peripheral film guiding surfaces in alignment, an odd number N series of freely revolvable film guiding spools laterally disposed on a common horizontal axis which is parallel to and below the axes of the sprocket and idler film guiding spool, said common horizontal axis being displaced horizontally in a direction perpendicular to its own length by a distance equal to the body diameter of the idler spools, said distance being measured from the axis of the idler film guiding spool and in a direction away from the sprocket, a second series of film guiding spools $$\frac{(N+1)}{2}$$

in number, on individual horizontal axes perpendicular to and on a level lower than the first N series and disposed with said spools in a vertical plane passing through the peripheral face of the idler film guiding spool farthest removed from the sprocket, said individual axes being located in vertical planes passing between the idler film guiding spool and the first of the N spools and between the next even and odd numbered successive N spools respectively, and a third series of film guiding spools $$\frac{(N+1)}{2}+1$$

in number all disposed in a vertical plane which passes through the peripheral faces of the N spools farthest removed from the idler film guiding spool, the first and last of the said spools being disposed on horizontal axes which are extensions of those of the first and last of the above mentioned $$\frac{(N+1)}{2}$$

spools and the remainder being disposed on horizontal axes parallel to those of the $$\frac{(N+1)}{2}$$

spools and on a higher level, said axes being located in vertical planes between the odd and even numbered successive N spools respectively, the second and third series of spools being mounted on a vertical movable frame.

EMERY MESCHTER.

REFERENCES CITED

The following references are of record in the file of this patent:

UNITED STATES PATENTS

| Number | Name | Date |
|---|---|---|
| 1,141,464 | Javault | June 1, 1915 |
| 2,133,109 | Munson | Oct. 11, 1938 |
| 2,224,947 | Blaney | Dec. 17, 1940 |
| 2,318,605 | Fess | May 11, 1943 |